United States Patent Office 3,712,822
Patented Jan. 23, 1973

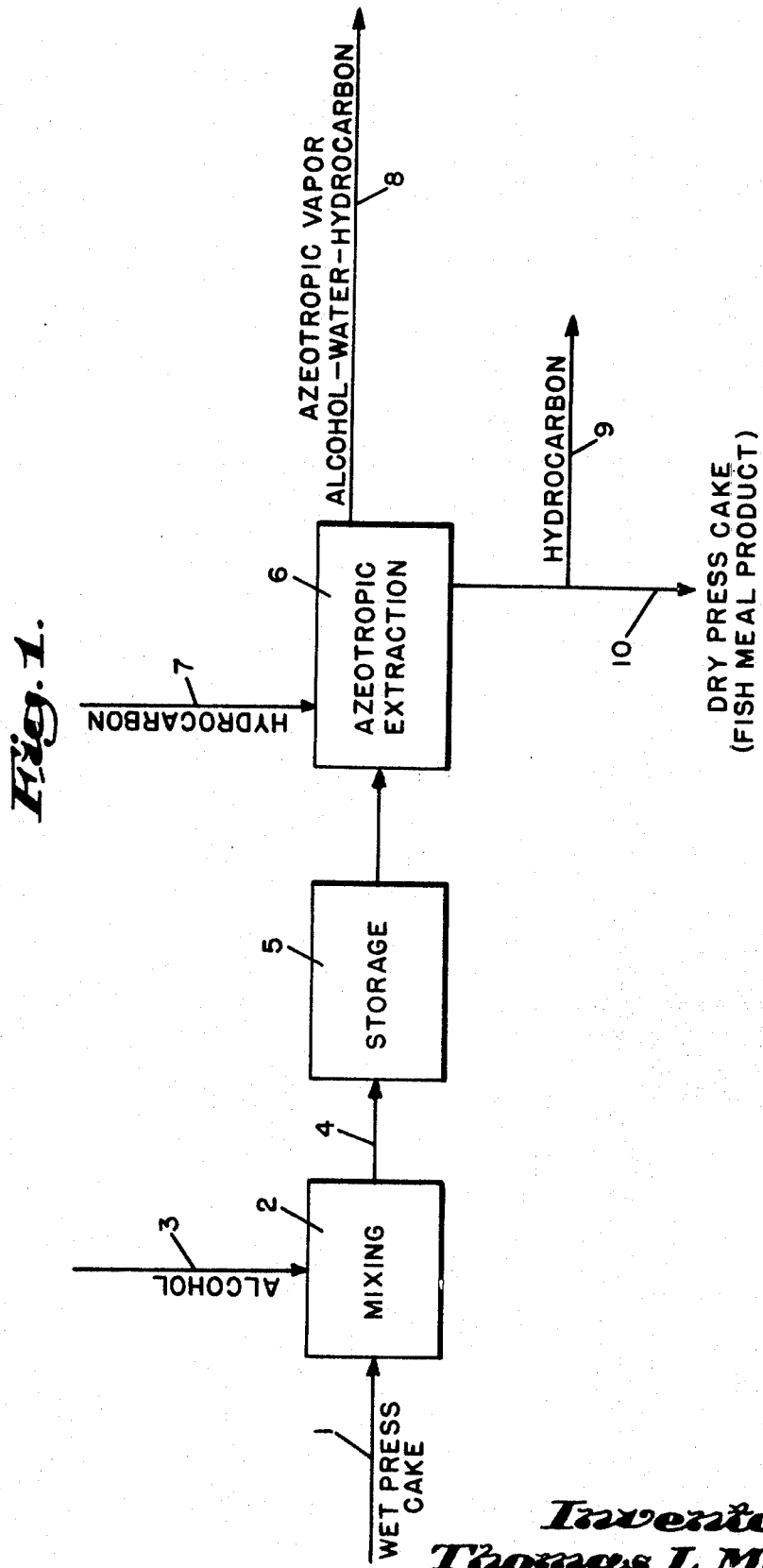

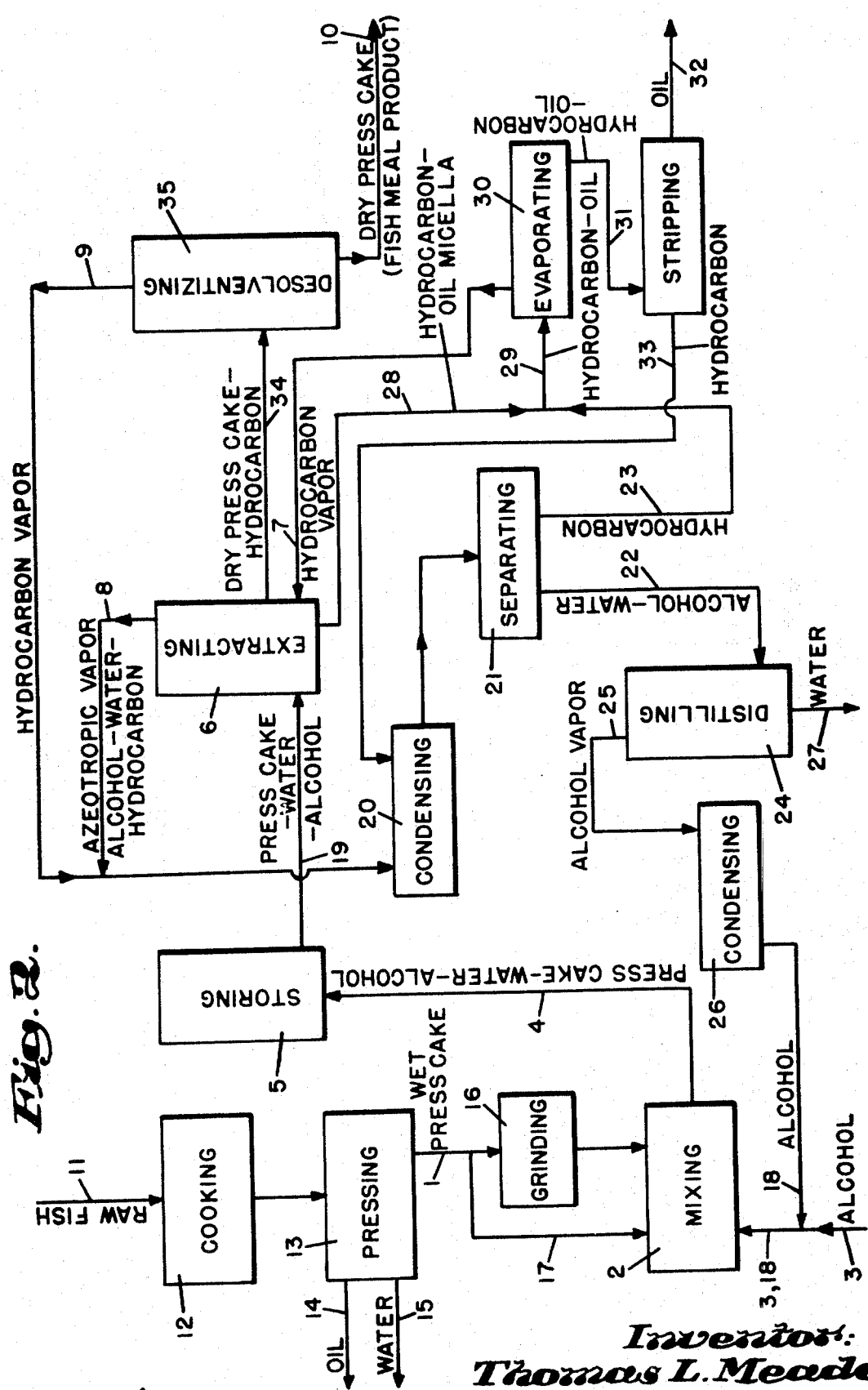

3,712,822
AZEOTROPIC REMOVAL OF WATER-HYDROCARBON ALCOHOL MIXTURES FROM PRESS FISH CAKE
Thomas L. Meade, 69 Kenyon Ave.,
Wakefield, R.I. 02879
Filed July 2, 1970, Ser. No. 52,042
Int. Cl. A23b 3/04; B01d 3/34
U.S. Cl. 99—209
26 Claims

ABSTRACT OF THE DISCLOSURE

A process for the preservation of wet fish press cake comprising the addition of an alcohol to the cake combined with the step of subsequently removing the alcohol and water by azeotropic extraction with a hydrocarbon. The process provides the advantages of allowing wet fish press cake to be stored for long periods of time, and when sufficient quantities have accumulated, the alcohol and water can be conveniently removed together to provide a dry fish meal product.

BACKGROUND OF THE INVENTION

This invention lies in the field of fish processing wherein raw fish is converted into oil and a dry high-protein fish meal product. More specifically, the invention relates to a novel method of preserving fish press cake prior to dehydration as well as to the dehydration step itself.

It has long been known that a high quality protein can be prepared by defatting and dehydrating cooked fish. Such protein material is commonly known as fish flour, fish protein concentrate or fish meal. Several factors make the use of fish meal particularly attractive. In addition to the fact that the meal is useful as a protein supplement for human or animal consumption, raw material costs are low and there is a large reservoir of fish suitable for processing available in the oceans of the world.

In the conventional wet reduction process for producing fish meal, raw fish are cooked, pressed to separate a major portion of the water and oil, and the press cake thereby obtained is then further defatted and/or dried to form fish meal. Cooking and pressing is one of the most efficient means for partial dehydration available. The primary product of this operation, wet press cake, is a perishable intermediate in the production of fish meal. However, the final drying step requires heavy capital investment for equipment of sufficient capacity to process large quantities of press cake. In addition, raw fish, like the press cake itself, is highly perishable and, therefore, must be rapidly converted into fish meal. On the other hand, the supply of raw fish fluctuates greatly.

Accordingly, a serious economical problem in the art of fish processing involving the conventional wet reduction process of cooking, pressing, and drying lies in the fact that plants utilizing such a process must be built with overcapacity in the final drying stages compared to the average load of raw fish material in order to accommodate the large quantity landings which occur from time to time. Thus, there is a real need in the art for a convenient method of preserving fish press cake prior to drying. Such a method of preservation would provide significant reduction in overall processing costs since the cake could then be stored in relation to supply fluctuations. This would allow for appropriate reduction in drying processing capacity with attendant economic benefits.

SUMMARY OF THE INVENTION

In accordance with the above-stated need in the art, a process has now been discovered whereby wet fish press cake can be preserved prior to drying for long periods; for example, periods in excess of 60 days, and can then be conveniently dehydrated. More specifically, the process involves mixing an alcohol with wet (water-containing) fish press cake and then storing the press cake-alcohol-water mixture in a silo or other suitable storage vessel for a period of time. Subsequently, when it is desired to convert the preserved cake into fish meal, a hydrocarbon solvent is added to the mixture which is then subjected to an azeotropic extraction wherein the alcohol, water and hydrocarbon are removed from the press cake in the form of tertiary and/or binary azeotropic vapors. This extraction substantially completely removes the alcohol from the press cake as well as effecting partial or complete dehydration. After the extraction, the dehydrated cake can be passed through a desolventizer to remove the hydrocarbon residue and to provide the fish meal product. Any oil present in the press cake can also be removed during the extraction in the form of a hydrocarbon-oil micella.

Thus, the present invention provides a process for preserving and dehydrating fish press cake, which comprises: (1) adding an alcohol to water-containing fish press cake; (2) storing the press cake-water-alcohol mixture of step 1 in a preserved state; and subsequently (3) removing the water and alcohol from the press cake-water-alcohol mixture of step 2 by adding a hydrocarbon to said mixture and extracting an azeotropic vapor comprising the alcohol and hydrocarbon followed by azeotropic vapor comprising water and hydrocarbon.

If desired, the azeotropic extraction step of the invention can be utilized per se to remove alcohol from any alcohol and water-containing press cake mixture. This unique extraction allows the substantially complete removal of alcohol in a single stage whereas conventional azeotropic extraction of simply water and alcohol from such mixtures theoretically requires an indefinite number of stages for complete alcohol removal.

In any event, utilization of the above process in combination with a conventional wet reduction process for obtaining fish meal allows the cooking and pressing operations to be carried out in direct relation to the supply of raw fish (landings) and yet, because of the ability to preserve the fish press cake, the final defatting and/or dehydration step can be suspended from time to time ad performed only when the accumulation of press cake matches installed processing capacity.

The prior art has attempted to preserve raw fish with isopropanol (see Marine Protein Concentrate, U.S. Department of the Interior, Fishery Leaflet 584) or sulfurous acid (see U.S. Pat. No. 3,468,674) and has subjected fish to azeotropic extractions with various solvents (see the above references and U.S. Pat. No. 3,252,962). However, the art has not directly faced the problem of preserving wet press cake nor suggested a solution to this problem wherein the press cake is preserved and subsequently conveniently defatted and/or dehydrated.

BRIEF DESCRIPTION OF THE DRAWINGS

The accompanying drawings present a schematic illustration of the fish preservation and extraction process of the present invention.

FIG. 1 shows the essential steps of the process which includes adding alcohol to wet press cake, storing and extracting. In FIG. 1, wet fish press cake 1 (the mixture of fish and water remaining after cooked fish has been pressed and a major portion of the water and oil has been separated therefrom) is mixed 2 with alcohol 3. The press cake-water-alcohol mixture 4 can then be stored 5 in a preserved state. From time to time, when the amount of preserved material in storage 5 so dictates, the press cake-water-alcohol mixture is placed in an azeotropic extraction zone 6, a hydrocarbon 7 is added, and the alcohol water and hydrocarbon 8 are removed in the form of azeotropic vapors 8. Remaining hydrocarbon 9 in the press cake can be removed by conventional desolventizing leaving the dry press cake 10 which is the desired fish meal product.

FIG. 2 shows preferred embodiments of the preservation and extraction process and also shows how the process can be used in combination with other steps to produce dry fish meal from raw fish. In FIG. 2, raw fish 11 are cooked 12 and then pressed 13 wherein a major portion of the oil 14 and water 15 are removed therefrom. An amount of water and some oil remains associated with the press cake. The wet oil-containing press cake 1 remaining after the pressing step is preferably ground 16, or is transferred directly 17 to a mixing stage 2 wherein alcohol 3, 18 is mixed therewith. The press cake-water-alcohol mixture 4 is then stored 5 for a period of time in a preserved state. Subsequently, the preserved press cake-water-alcohol mixture 19 is placed in an azeotropic extraction zone 6, a hydrocarbon 7 is added, and the alcohol, water and hydrocarbon 8 are removed in the form of azeotropic vapors. These vapors 8 are condensed 20 and ultimately separated 21, e.g., by decantation, into an alcohol-water phase 22 and a hydrocarbon phase 23. The alcohol-water phase is distilled 24 whereby alcohol vapor 25 is driven off, condensed 26 and re-used 18 in combination with the original alcohol feed stream 3, and the water residue 27 is discarded. The decanted hydrocarbon 23 is combined with a hydrocarbon-oil micella 28 which is withdrawn from the extraction zone 6 and the combined mixture 29 is evaporated 30. The hot hydrocarbon vapors emitting from the evaporation 30 preferably serve as the hydrocarbon feed 7 to the extraction zone 6 and provide heat for the extraction. The oil residue 31 remaining after the evaporation step can be stripped 32 of any remaining hydrocarbon to provide pure oils 32 which in turn can be combined with the oil 14. The hydrocarbon 33 so stripped can be recycled by adding it to the alcohol-water-hydrocarbon condensate 20. The azeotropic extraction 6 can substantially completely remove all traces of water and alcohol from the press cake but leaves some hydrocarbon residue associated therewith. This residue 34, comprising dry press cake plus hydrocarbon, is removed from the extraction zone 6 and desolventized 35, e.g., in a rotary vacuum evaporator, wherein the hydrocarbon 9 is removed and recycled leaving dry press cake 10 which is the desired fish meal product.

DESCRIPTION OF THE PREFERRED EMBODIMENTS

The present invention is applicable to all types of fish; for example, whale, white sea fish such as cod, whiting, haddock, sea-bream, coal fish, shark, dog fish and catfish; fresh water fish such as carp; fatty fish such as menhaden, herring; or low grade starting materials such as fish offal. The raw fish is preferably cooked, e.g., with steam, and the cooked fish is then pressed to obtain press liquor containing oil and fish press cake. The fish press cake, which is the starting material in the process of the present invention, generally contains from about 40% to about 70% water, preferably from about 50% to about 55% water. In addition, the fish press cake starting material generally has a major portion or all of its oil content removed in the pressing operation and thus contains from about 2% to about 10% oil, preferably from about 3% to about 5% oil. As will be described hereinafter, this oil is conveniently removed along with the water and alcohol in the azeotropic extraction step. Fish press cake per se can be used as the starting material or alternatively, the fish press cake can be ground, e.g., in a grinder, hammer mill or Fitzpatrick mill, to obtain a comminuted product. Preferably, the press cake is in particulate form such that it will pass through a #3 mesh screen.

The preservation step of the invention involves adding an alcohol to the fish press cake obtained as described above. A wide variety of alcohols are suitable for this step, and the choice is usually dictated by availability, preservative strength, and ease of removability in the subsequent extraction step. Examples of suitable alcohols include aliphatic monohydric alcohols of from 1 to 10 carbon atoms such as methanol, ethanol, decyl alcohol and the like. Lower aliphatic monohydric alcohols, e.g., those containing up to 6 carbon atoms, are preferred and of these methanol, ethanol, n-propanol and isopropanol or mixtures thereof represent preferred alcohols for use herein.

The method of adding the alcohol to the fish press cake is not critical and conventional means can be employed. It is desirable, however, to obtain a uniform dispersion and an intimate contact between the alcohol and the press cake solids and thus a mixing step during and/or after the addition of alcohol is preferred. This mixing can be carrier out in a conventional apparatus such as a ribbon blender or a stainless steel tank equipped with a turbine agitator. The amount of alcohol added to the press cake is preferably of such quantity to provide a press cake-water-alcohol mixture containing 5% to 100% alcohol, preferably 10 to 50% alcohol.

The fish press cake-water-alcohol mixture can then be stored in a preserved state for any convenient period of time. Examples of operable storage times include 1 hour, 10 hours, 30 hours, 1000 hours and 2000 hours, preferably, the fish press cake-water-alcohol mixture is stored for a period of time of from about 24 to about 1500 hours (2 days to 60 days). Any suitable apparatus can be used to store the preserved fish press cake-alcohol mixture; for example, a storage silo or a large stainless steel tank. Preferably, during storage the temperature of the mixture is maintained within the range of from about 32° F. to 113° F. The stored mixture can be exposed to the atmosphere but is preferably protected therefrom.

Subsequently, when it is desired to finish processing, i.e., to remove remaining oil and/or to dehydrate and remove the alcohol from the mixture, the preserved press cake-water-alcohol mixture is transferred from storage to an extractor wherein a hydrocarbon is added to the mixture, heat is applied, and the water and alcohol are removed from the press cake in the form of azeotropic vapors comprising alcohol-water-hydrocarbon or alcohol-hydrocarbon followed by water-hydrocarbon.

As heat is supplied to the extraction zone, the alcohol and water are removed in the form of a ternary or binary azeotropic vapor, followed by a binary vapor depending upon the selection of alcohol and hydrocarbon.

For example, when the alcohol is ethanol or isopropanol and the hydrocarbon is n-heptane, hexane, or isooctane, a ternary azeotropic vapor comprising the alcohol, water and hydrocarbon is first removed from the extraction zone at constant temperature until the alcohol in the remaining press cake mixture is substantially completely depleted. The temperature then rises until it again becomes constant at the boiling point of a binary azeotrope comprising water and hydrocarbon. This azeotropic vapor can be removed from the extraction zone until the water remaining in the press cake mixture is decreased to the desired level. As another example, when the alcohol is methanol and the hydrocarbon is n-heptane, hexane or isooctane, a binary azeotrope comprising alcohol and hydrocarbon is first removed from the extraction zone until the alcohol in the remaining press cake mixture is substantially completely depleted whereupon the temperature rises to the boiling point of a second binary azeotrope comprising water and hydrocarbon. This azeotropic vapor can also be removed at constant temperature until the water remaining in the press cake mixture is decreased to a desired level.

As described above, though the sequential formation of azeotropic vapors initially comprising alcohol-water-hydrocarbon or alcohol-hydrocarbon followed by water-hydrocarbon, all traces of alcohol are readily removed from the press cake. Moreover, through the selection of operating conditions any desired degree of defatting and/ or dehydration can be achieved in the extraction step.

The resultant vapors from the extraction zone are condensed and the hydrocarbon phase is separated by decantation. The alcohol-water-phase is fed to a conventional distillation column and the alcohol recovered for reuse.

More specifically, the hydrocarbon used in the extraction step should be one which is water-immiscible, forms an azeotropic mixture with water and the selected alcohol and, preferably, is a solvent for the oil associated with the press cake. Preferably, the hydrocarbon is non-polar since such materials, e.g., ethylene dichloride, are often corrosive and highly flammable. The non-polar aliphatic hydrocarbons, preferably saturated, represent a class of materials for use herein which can have the properties described above. Most preferably, such non-polar aliphatic saturated hydrocarbons have from about 4 to about 10 carbon atoms. Within this group, preferred materials are n-hexane, n-heptane, isooctane and mixtures thereof.

The amount of hydrocarbon added to the press cake-water-alcohol mixture in the extraction zone should be sufficient to maintain azeotropic conditions. Accordingly, it is desirable to add continuously hydrocarbons as the azeotropic vapor is removed. In any event, the amount of hydrocarbon in the liquid phase in the extraction zone should preferably be maintained within the range of from about 50% to about 500%, preferably from about 100% to about 200%, based on the dry weight of press cake present in the extraction zone.

The extraction is desirably carried out at a pressure within the range of from about 200 mm. to about 1000 mm., preferably from about 760 mm. to about 800 mm. The temperature of the vapor phase in the extraction zone corresponds to the constant boiling temperature of the azeotrope under the pressure conditions present therein and is generally within the range of from about 50° F. to about 220° F., preferably from about 120° F. to about 170° F.

Heat can be supplied to the extraction zone by any conventional means, e.g., by steam piping or jacketing. It is desirable that at least a portion of the heat be supplied to the extraction zone by the hydrocarbon which can be added thereto in the form of a hot vapor. This is advantageous because of two factors. First, when the hydrocarbon is added, e.g., continuously, to the extraction zone in the form of a hot vapor, these vapors contact the press cake particles (as well as the alcohol and water present) and condense thereon which liberates heat. The heat so liberated effects evaporation of water and alcohol and helps maintain a heat balance within the system. Second, hot hydrocarbon vapors are generally available from a preferred subsequent step in the process wherein the hydrocarbon and oil are separated by evaporation.

As part of the azeotropic extraction step, the hydrocarbon is preferably a solvent for the oil associated with the presscake and during the extraction step a micella comprised of hydrocarbon and oil forms in the liquid phase. This micella can be withdrawn from the reaction zone, preferably continuously, and the hydrocarbon and oil can be separated from each other by evaporation and stripping. The separated hydrocarbon is preferably recycled to the extraction zone and the oil is a useful fish by-product.

As noted above, the alcohol is substantially completely removed from the press cake during the azeotropic extraction step, and by selecting operating conditions within the ranges set forth herein, any degree of deoiling and/or dehydration can concurrently be accomplished during this step. Preferably, the alcohol, water and oil are all removed during the extraction step to leave a press cake product containing less than 10% water, less than 0.5% oil, less than 0.005% alcohol and from about 40% to 60% hydrocarbon. Hydrocarbon associated with the press cake emitting from the extraction zone can be separated therefrom by conventional desolventization, e.g., by passing over a heated surface at atmospheric or reduced pressure and/or contacting with steam, or by treating in a rotary vacuum evaporator.

All percentages herein are by weight unless otherwise so stated.

EXAMPLE (Preparation of fish press cake)

10 liters of water was added to 20 kg. of raw sea herring (*Clupea harengus*) (Linnaeus)1758, taken in the North Atlantic in the vicinity of Block Island, and the mixture cooked by holding in a 125 liter steam jacketed kettle for 10 minutes. Free water was decanted from the above mixture and 1,500 gram portions of cooked herring were wrapped in muslin cloth and pressed in a Carver laboratory hydraulic press at a maximum pressure of 10,000 p.s.i. The resultant press cake portions were removed from the cloth and totalled 7,850 grams. Of this total, the water content was 55%, and the oil content was 4.25%. The press cake was passed through a Hobart meat grinder equipped with a discharge plate die having one-fourth inch diameter openings to obtain the cake in particulate form such that it would pass through a #3 inch screen.

(Preservation)

950 grams of ethanol (95%) was added to the ground press cake-water mixture to obtain a press-cake-water-alcohol mixture containing 12% alcohol. This mixture was mixed in a twin shell liquid-solids blender to provide a uniform dispersion and intimate contact between the press cake particles and the alcohol. 2,500 gram portions of the press-cake-water-alcohol mixture were placed in each of three 4 liter tin can containers which were then sealed at approximately atmospheric pressure and stored at ambient temperature (68°–86° F.) for 5, 30 and 60 days respectively. At the time indicated, the containers were opened and the alcohol preserved press cake was processed into fish meal which was then analyzed for fish protein characteristics. These data are shown in the following table:

FISH PROTEIN CHARACTERISTICS

| | Time preserved with ethanol | | |
|---|---|---|---|
| | 5 days | 30 days | 60 days |
| Protein | 84.8 | 85.3 | 85.7 |
| Fat | 0.2 | 0.5 | 0.2 |
| Ash | 9.0 | 9.9 | 8.9 |
| Moisture | 8.1 | 8.9 | 8.0 |

These data indicate essentially no difference in samples and also show total preservation.

(Azeotropic extraction)

2,500 grams of the preserved press-cake water-alcohol mixture obtained as described above was placed in a 12 liter extractor along with 4 liters of n-heptane. The apparatus comprised a 12 liter, stainless steel, stirred reactor flask, heated with a Glas-Col electric mantle. A three neck glass reactor flask cover permitted the continuous addition of hydrocarbon (n-heptane) from a 2 liter separatory funnel equipped with an equalizer arm, and the continuous removal and condensation of the azeotropic vapors. The temperature of the material in the extractor was brought up to 155.4° F., which is the boiling point for an ethanol-heptane-water ternary azeotrope comprising 33.0 ethanol, 60.9% heptane and 6.10% water. This temperature gradually increased as the amount of ethanol remaining diminished. When all the ethanol had been depleted from the press cake material, the boiling temperature again became constant at 175° F., which is the boiling point for a heptane-water-binary azeotrope comprising 87.1% heptane and 12.9% water. Water was removed from the press cake material through the formation of the binary azeotrope with heptane, until the amount of water in the press cake material was reduced to less than 10%. Simultaneously, the amount of oil in the press cake material was reduced to less than 0.5% via the formation of an oil-heptane micella. At this point the temperature of the materials in the reactor reached 185° F. During the extraction, n-heptane at ambient temperature (77° F.) was continuously added to the extractor at a rate equivalent to the removal of n-heptane in the azeotropic vapors.

During the initial formation of the ethanol-heptane-water ternary azeotrope, the vapor was condensed and cooled to between 68°–70° F. The condensate separate into two layers with the upper amount of 65% by volume and the lower 35%. The upper layer contained ethanol 5%, heptane 94.8%, and water 0.2%. The lower layer contained ethanol 76%, heptane 9%, and water 15%.

The condensate recovered during the rapid transition state between the ternary azeotropic and the higher boiling binary azeotrope was characterized by a continuous change in ratio and composition of the upper and lower layers.

With the attainment of a stable heptane-water-binary azeotrope vapor, condensation and cooling to 68°–70° F. resulted in phase separation with the upper layer consisting of 99.95% heptane and amounting to 90% by volume, the lower layer consisted of water essentially free of heptane and amounting to 10% by volume.

After the extraction, the oil-heptane-miscella was decanted and the press cake was washed twice with 2,500 ml. volumes of n-heptane. The resultant press cake contained less than 10% water, less than 0.5% oil, less than 0.005% alcohol, and about 50% heptane. This heptane-wet cake was then placed in an evaporator flask which was connected to a condenser flask. Heating to 125° F. at 200 mm. Hg for one hour while rotating the flask at 25 r.p.m. provided a heptane-free, substantially dry, fish meal product.

In this example, heptane and alcohol recovery and recycle are accomplished as described hereinbefore. Also in this example, substantially equivalent results are obtained in that wet fish press cake is preserved by adding an alcohol, and the alcohol and the water are subsequently removed by azeotropic extraction with a hydrocarbon, when any one of the following alcohols and/or hydrocarbons are respectively substituted for the ethanol and n-heptane of the example:

Alcohol:
 methanol
 n-propanol
 isopropanol
 decyl alcohol
 mixture of these alcohols Hydrocarbon:
 n-hexane
 isooctane
 50:50 mixture of n-hexane and n-heptane Further in the above example, similar results are obtained when the hydrocarbon is added to the extractor in the form of a hot vapor and the oil-hydrocarbon miscella is continuously withdrawn from the reactor during the azeotropic extraction.

What I claim is:

1. A process for providing an alcohol-free dehydrated fish press cake, which process comprises:
 (a) contacting a water-alcohol-containing fish press cake with a saturated aliphatic hydrocarbon, the hydrocarbon being water-immiscible and forming on heating an azeotropic vapor mixture with the water and the alcohol in the fish press cake, the alcohol comprising a lower aliphatic monohydric alcohol of from one to ten carbon atoms,
 (b) heating the water-alcohol-hydrocarbon-fish press cake mixture to extract first an azeotropic vapor mixture comprising the alcohol and the hydrocarbon to remove all or substantially all of the alcohol; and, subsequently,
 (c) heating the remaining mixture to extract an azeotropic vapor mixture comprising water and hydrocarbon, thereby providing an alcohol-free dehydrated fish press cake product.

2. The process of claim 1 which includes the steps of:
 (a) adding to a water-containing fish press cake an alcohol to preserve the fish press cake; and
 (b) storing the press cake water-alcohol mixture in a preserved state for a predetermined period of time prior to contacting the mixture with the hydrocarbon.

3. The process of claim 1 wherein the alcohol is methanol and which includes the steps of: heating to extract an azeotropic binary vapor mixture of the methanol and hydrocarbon to remove all or substantially all of the methanol; and, thereafter, heating to extract an azeotropic binary vapor mixture of the water and the hydrocarbon to dehydrate the mixture.

4. The process of claim 1 which includes the steps of removing hydrocarbon from the alcohol-free dehydrated fish press cake and recovering the dehydrated fish press cake.

5. The process of claim 1 which includes the steps of condensing and separating the azeotropic vapor mixture comprising alcohol and hydrocarbon and recycling all or a part of the alcohol hydrocarbon for reuse in the process.

6. The process of claim 1 which includes the steps of employing a hydrocarbon which is a solvent for the oil in the fish press cake, evaporating such hydrocarbon from the hydrocarbon-oil solvent mixture and recovering the oil.

7. The process of claim 6 which includes the steps of evaporating hydrocarbon from the alcohol-free dehydrated fish press cake to obtain a hydrocarbon-free fish press cake and a hot vapor of the hydrocarbon, and contacting the alcohol-water-containing fish press cake with the hot vapor of the hydrocarbon evaporated.

8. The process of claim 1 wherein the hydrocarbon is a saturated aliphatic hydrocarbon containing from about four to ten carbon atoms.

9. The process of claim 1 wherein the fish press cake-alcohol-water-hydrocarbon mixture is heated to a temperature so that the temperature of the extracted azeotropic vapor is within the range of from about 50° F. to about 220° F.

10. The process of claim 1 wherein the amount of alcohol added to the water-containing fish press cake is from about 5 to 100% by weight of the fish press cake water-alcohol mixture, and wherein the amount of hydrocarbon added to the water-alcohol fish press cake mixture is from about 50 to 500% by weight based on the dry weight of the fish press cake.

11. The method of claim 1 which includes the steps of heating to extract a ternary azeotropic vapor mixture comprising hydrocarbon, water and alcohol to remove all or substantially all of the alcohol, and, thereafter, heating to extract a binary azeotropic mixture comprising the hydrocarbon and water.

12. The process of claim 1 which includes the steps of removing from the dehydrated alcohol-free fish press cake a miscella comprising the hydrocarbon and oil from the liquid phase, separating the hydrocarbon and oil by evaporation, recovering the oil so separated and recycling the separated hydrocarbon as a hot vapor for use in the contacting step.

13. The process of claim 1 which includes contacting the water-alcohol-containing fish press cake with the hot vapor of the hydrocarbon to condense the hydrocarbon on the fish press cake, thereby liberating heat.

14. A process for preserving and dehydrating fish press cake, which process comprises:

(a) adding to a water-containing fish press cake a monohydric aliphatic alcohol having from one to ten carbon atoms in an amount of from 5 to 100% by weight of the alcohol to the weight of the alcohol fish press cake water-containing mixture;

(b) contacting the mixture with a saturated water-immiscible aliphatic hydrocarbon in an amount of from about 50 to 500% by weight based on the dry weight of the fish press cake, the hydrocarbon containing from about 4 to 10 carbon atoms, the hydrocarbon selected to form on heating with the alcohol an azeotropic vapor mixture, the hydrocarbon contacting the mixture in the form of a hot vapor which condenses on the mixture;

(c) heating the water-alcohol-hydrocarbon-fish press cake mixture to extract an azeotropic vapor mixture comprising alcohol and hydrocarbon to remove all or substantially all of the alcohol, and, thereafter, to extract an azeotropic vapor mixture comprising water and hydrocarbon; and (d) removing hydrocarbon from the extracted mixture and recovering the alcohol-free dehydrated fish press cake.

15. The process of claim 14 wherein the alcohol is methanol, ethanol, n-propanol, isopropanol, decyl alcohol or mixtures thereof.

16. The process of claim 14 wherein the hydrocarbon is n-hexane, n-heptane, isooctane or mixtures thereof.

17. The process of claim 14 wherein the fish press cake water-alcohol-containing mixture contains from about 10 to 50% by weight of alcohol, and wherein such mixture contains from about 100 to 200% by weight based on the dry weight of the fish press cake of the hydrocarbon.

18. The process of claim 14 which includes heating to provide a temperature of the vapor of from about 120 to 170° F.

19. The process of claim 14 which includes the step of storing the water-alcohol press cake mixture for a period of time of from about 2 to 60 days so as to preserve the fish cake mixture.

20. The process of claim 14 wherein the alcohol is methanol and which includes the steps of heating the water-methanol-hydrocarbon-containing fish press cake mixture to first extract a methanol and hydrocarbon binary azeotropic vapor mixture, and, thereafter, to extract a hydrocarbon and water binary azeotropic mixture.

21. The process of claim 14 which includes the steps of removing a liquid hydrocarbon-oil-miscella mixture from the contacting zone, evaporating the hydrocarbon from the hydrocarbon-oil-miscella mixture to provide a hot vapor of the hydrocarbon, and recycling the hot vapor of the hydrocarbon to contact the alcohol-water fish press cake mixture, to condense the hot vapor thereon, thereby liberating heat.

22. The process of claim 14 which includes the steps of condensing the azeotropic vapor mixtures, separating the condensed hydrocarbon from the alcohol-water mixture, heating the hydrocarbon to provide a hot vapor, and recycling the hot vapor of the hydrocarbon into contact with the alcohol-water-containing fish press cake mixture, and distilling the alcohol-water mixture, condensing the alcohol so distilled and recycling the alcohol for use in providing an alcohol-water-containing fish press cake mixture.

23. The process of claim 14 which includes the steps of removing the hydrocarbon from the extracted mixture by desolvatizing the dry fish press cake and hydrocarbon, and recovering the dry hydrocarbon-free alcohol-free press cake product.

24. A process for the preservation and dehydration of fish press cake, which process comprises:

(a) adding an aliphatic monohydric alcohol containing from about one to ten carbon atoms to a water-containing fish press cake;

(b) storing the water-alcohol fish press cake in a preserved state for a desired period of time;

(c) adding to the alcohol-water fish press cake a saturated aliphatic water-immiscible hydrocarbon having from about 4 to 10 carbon atoms, the hydrocarbon added at least in part in the form of a hot vapor of the hydrocarbon which condenses on the mixture to provide heat thereto by such condensation;

(d) heating the fish press cake water-alcohol hydrocarbon mixture to extract an azeotropic vapor mixture comprising the alcohol and the hydrocarbon, and to remove all or substantially all of the alcohol, and thereafter, to dehydrate the mixture by extracting an azeotropic vapor mixture comprising a hydrocarbon and the water; and (e) condensing the azeotropic vapor mixture, separating the hydrocarbon so condensed from the condensed alcohol-water mixture, distilling the alcohol-water mixture to recover the alcohol, condensing the alcohol, and recycling all or a part of the alcohol for use in adding to the water-containing fish press cake mixture, removing a liquid hydrocarbon of a micella mixture from the extraction zone, evaporating the hydrocarbon to provide a hot vapor of the hydrocarbon, recycling the hot vapor of the hydrocarbon so formed into contact with the alcohol-water-containing fish press cake mixture, recovering a dry fish press cake alcohol-free hydrocarbon mixture, desolvatizing the hydrocarbon from the mixture, recovering a dry hydrocarbon-free alcohol-free fish press cake product, and recovering the oil removed from the hydrocarbon-oil-miscella mixture.

25. The process of claim 24 which includes recycling the hydrocarbon vapor from the desolvatizing step into the condensing zone to condense the hydrocarbon vapor, and stripping the hydrocarbon after evaporation from the hydrocarbon-oil mixture to provide a pure oil which is recovered, and recycling the hydrocarbon so stripped into the condensing zone.

26. The process of claim 24 wherein the alcohol is methanol, ethanol, n-propanol, isopropanol, decyl alcohol or mixtures thereof, and the hydrocarbon is n-hexane, n-heptane, isooctane or mixtures thereof.

References Cited

UNITED STATES PATENTS

| 2,695,267 | 11/1954 | Challis | 203—70 |
| 2,875,061 | 2/1959 | Vogel | 260—112 |
| 3,525,623 | 8/1970 | Osterman | 99—209 |
| 2,567,179 | 9/1951 | Bonotto | 99—7 |
| 1,934,677 | 11/1933 | Ash | 99—209 |
| 3,252,962 | 5/1966 | Whaley et al. | 99—209 |
| 3,076,708 | 2/1963 | Cavanagh | 99—7 |
| 2,617,757 | 11/1952 | Michael | 203—70 |
| 3,649,294 | 3/1972 | Thijssen | 260—412 |

FOREIGN PATENTS

| 835,813 | 5/1960 | Great Britain | 260—112 |

NORMAN YUDKOFF, Primary Examiner

C. P. RIBANDO, Assistant Examiner

U.S. Cl. X.R.

99—2E, 158, 112; 203—63, 70; 260—412